US009952612B2

(12) United States Patent
Converse

(10) Patent No.: US 9,952,612 B2
(45) Date of Patent: Apr. 24, 2018

(54) POWER SYSTEM HAVING ZONE-BASED LOAD SHARING

(71) Applicant: Caterpillar Inc., Peoria, IL (US)

(72) Inventor: Perry Dwain Converse, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 559 days.

(21) Appl. No.: 14/636,582

(22) Filed: Mar. 3, 2015

(65) Prior Publication Data

US 2016/0259356 A1 Sep. 8, 2016

(51) Int. Cl.
*G05D 3/12* (2006.01)
*G05D 5/00* (2006.01)
*G05D 9/00* (2006.01)
*G05F 1/66* (2006.01)

(52) U.S. Cl.
CPC ...................................... *G05F 1/66* (2013.01)

(58) Field of Classification Search
CPC .......................................................... G05F 1/66
USPC .................................................. 700/295–298
See application file for complete search history.

(56) References Cited

U.S. PATENT DOCUMENTS

| | | | | |
|---|---|---|---|---|
| 5,005,781 | A | 4/1991 | Schultz et al. | |
| 6,470,258 | B1 | 10/2002 | Leamy et al. | |
| 7,113,839 | B2 | 9/2006 | Ferguson et al. | |
| 7,489,992 | B2 | 2/2009 | Valette et al. | |
| 7,516,244 | B2 | 4/2009 | Kelly et al. | |
| 7,979,192 | B2 | 7/2011 | Morrison et al. | |
| 8,116,936 | B2 | 2/2012 | Hershey et al. | |
| 8,145,379 | B2 | 3/2012 | Schwinke | |
| 8,350,412 | B2 | 1/2013 | Massie et al. | |
| 8,364,375 | B2 | 1/2013 | Chapman et al. | |
| 8,504,215 | B1 | 8/2013 | Mccorkendale et al. | |
| 8,738,191 | B2 | 5/2014 | Aivaliotis et al. | |
| 2009/0150023 | A1 | 6/2009 | Grau et al. | |
| 2011/0029148 | A1* | 2/2011 | Yang | H02H 7/28 700/297 |
| 2011/0224838 | A1* | 9/2011 | Imes | F24F 11/006 700/295 |

(Continued)

OTHER PUBLICATIONS

"BlueDrive PlusC—New Diesel Electric Propulsion System", Marine Solutions, pp. 1-6, www.siemens.no/marine, downloaded Mar. 3, 2015.

(Continued)

*Primary Examiner* — Ziaul Karim
(74) *Attorney, Agent, or Firm* — Finnegan, Henderson, Farabow, Garrett & Dunner, LLP

(57) ABSTRACT

A power system is provided for a machine, such as a marine or petroleum drilling vessel. The power system may have a plurality of power sources, each with an operating range divided into a plurality of power zones. The power system may also have at least one power consumer driven by the plurality of power sources, a load manager associated with the at least one power consumer and configured to create a load demand for the plurality of power sources, and a controller in communication with the load manager and the plurality of power sources. The controller may be configured to determine a current operational mode of the power system, and to selectively cause the plurality of power sources to operate in particular zones of the plurality of power zones based on the current operational mode and the load demand.

20 Claims, 6 Drawing Sheets

(56) References Cited

U.S. PATENT DOCUMENTS

| | | | | |
|---|---|---|---|---|
| 2012/0245744 | A1 | 9/2012 | Prosser et al. | |
| 2013/0231841 | A1 | 9/2013 | Rothschild | |
| 2013/0342020 | A1* | 12/2013 | Blevins | H02J 4/00 307/84 |
| 2014/0152006 | A1* | 6/2014 | Sterregaard | B60W 10/08 290/7 |
| 2014/0159365 | A1* | 6/2014 | Algrain | H02J 3/32 290/7 |
| 2016/0031391 | A1* | 2/2016 | Dong | B60R 16/023 307/9.1 |

OTHER PUBLICATIONS

BlueDrive PlusC—Makes Vessels Safer, More Profitable and Environmentally Friendly, Marine & Shipbuilding, pp. 1-9, www.siemens.no/marine, downloaded Mar. 3, 2015.

* cited by examiner

EXEMPLARY POWER DISTRIBUTION

| DP | TRANSIT | PULLING |
|---|---|---|
| HIGH | MED | HIGH |
| MED | LOW | HIGH |
| MED | HIGH | LOW |
| LOW | HIGH | LOW |

POWER SYSTEM HAVING ZONE-BASED LOAD SHARING

TECHNICAL FIELD

The present disclosure relates generally to a power system and, more particularly, to a power system having zone-based load sharing.

BACKGROUND

Marine vessels often include multiple engines harnessed together to drive one or more primary loads (e.g., propellers) and various auxiliary loads (e.g., HVAC, lighting, pumps, etc.). The engines can be mechanically connected to the loads or electrically connected to the loads by way of generators. In some applications, the loads of a vessel can be driven both mechanically and electrically in a hybrid arrangement.

In typical marine applications, all engines are simultaneously operated to produce about the same amount of power. For example, a particular marine vessel may have four identical engines each capable of producing about 5,000 kW. And during operation, all of the engines may be operated at the same level (e.g., at about 20% capacity) to evenly distribute the loads (e.g., to evenly distribute a 4,000 kW load). In some situations, however, an even distribution of the loads between the engines may not optimal. For instance, operating four engines at 20% capacity may be less fuel efficient, less responsive, and/or produce more emissions than operating only one of the engines at about 80% capacity or operating two engines at 30% capacity and one engine at 20% capacity.

An attempt at improving power generation efficiency is disclosed in U.S. Patent Application Publication 2013/0342020 of Blevins et al. that published on Dec. 26, 2013 ("the '020 publication"). In particular, the '020 publication discloses a power grid having a set of controllable generators and a grid controller. The grid controller is configured to determine current system load conditions of the power grid, to compute all possible load partitions between the generators associated with a total fuel consumption, and to identify a load partition with a minimum total fuel consumption from among all the possible load partition solutions. The load partition is determined from performance characterization models that are developed based on performance curves provided by the generator manufacturer, maintenance data, monitored performance data, and environmental data.

Although touted as an improvement over existing technologies, the power grid of the '020 publication may still be less than optimal. For example, it may be time consuming to compute all possible load partition solutions, resulting in system delays. Further, constantly computing and changing the load partition solutions each time the load conditions of the power grid change could result in unstable power grid conditions.

The disclosed power system is directed at overcoming one or more of the problems set forth above and/or other problems in the prior art.

SUMMARY

According to one exemplary aspect, the present disclosure is directed to a power system. The power system may include a plurality of power sources, each with an operating range divided into a plurality of power zones. The power system may also include at least one power consumer driven by the plurality of power sources, a load manager associated with the at least one power consumer and configured to create a load demand for the plurality of power sources, and a controller in communication with the load manager and the plurality of power sources. The controller may be configured to determine a current operational mode of the power system, and to selectively cause the plurality of power sources to operate in particular zones of the plurality of power zones based on the current operational mode and the load demand.

According to another exemplary aspect, the present disclosure is directed to another power system. This power system may include a plurality of generator sets of different capacities, each having an operating range divided into a plurality of power zones. The power system may also include at least one power consumer driven by the plurality of generator sets, a load manager associated with the at least one power consumer and configured to create a load demand for the plurality of generator sets, and a controller in communication with the load manager and the plurality of generator sets. The controller may be configured to determine a current operational mode of the power system as one of a dynamic positioning mode, a transit mode, and a pulling mode, and to link a set of performance goals associated with fuel consumption, emissions, transient response, and engine wear to the current operational mode. The controller may also be configured to selectively cause the plurality of generator sets to operate in particular zones of the plurality of power zones based on the current operational mode, the set of performance goals, and the load demand. The controller may further be configured to determine a change in the load demand, to selectively increase a power output of the plurality of generator sets in a closed-loop manner based on the change in load demand, to determine when the power-output of at least one of the plurality of generator sets reaches a boundary of an associated zone of the plurality of power zones, and to responsively cause the at least one of the plurality of generator sets to transition operation into a new zone of the plurality of power zones.

According to yet another exemplary aspect, the present disclosure is directed to a method of controlling a power system. The method may include creating a demand for power to be directed from a plurality of power sources to at least one power consumer, and determining a current operational mode of the power system. The method may also include selectively causing each of the plurality of power sources to operate in particular zones within corresponding operating ranges based on the current operational mode and the demand for power.

DETAILED DESCRIPTION

Figure 1:
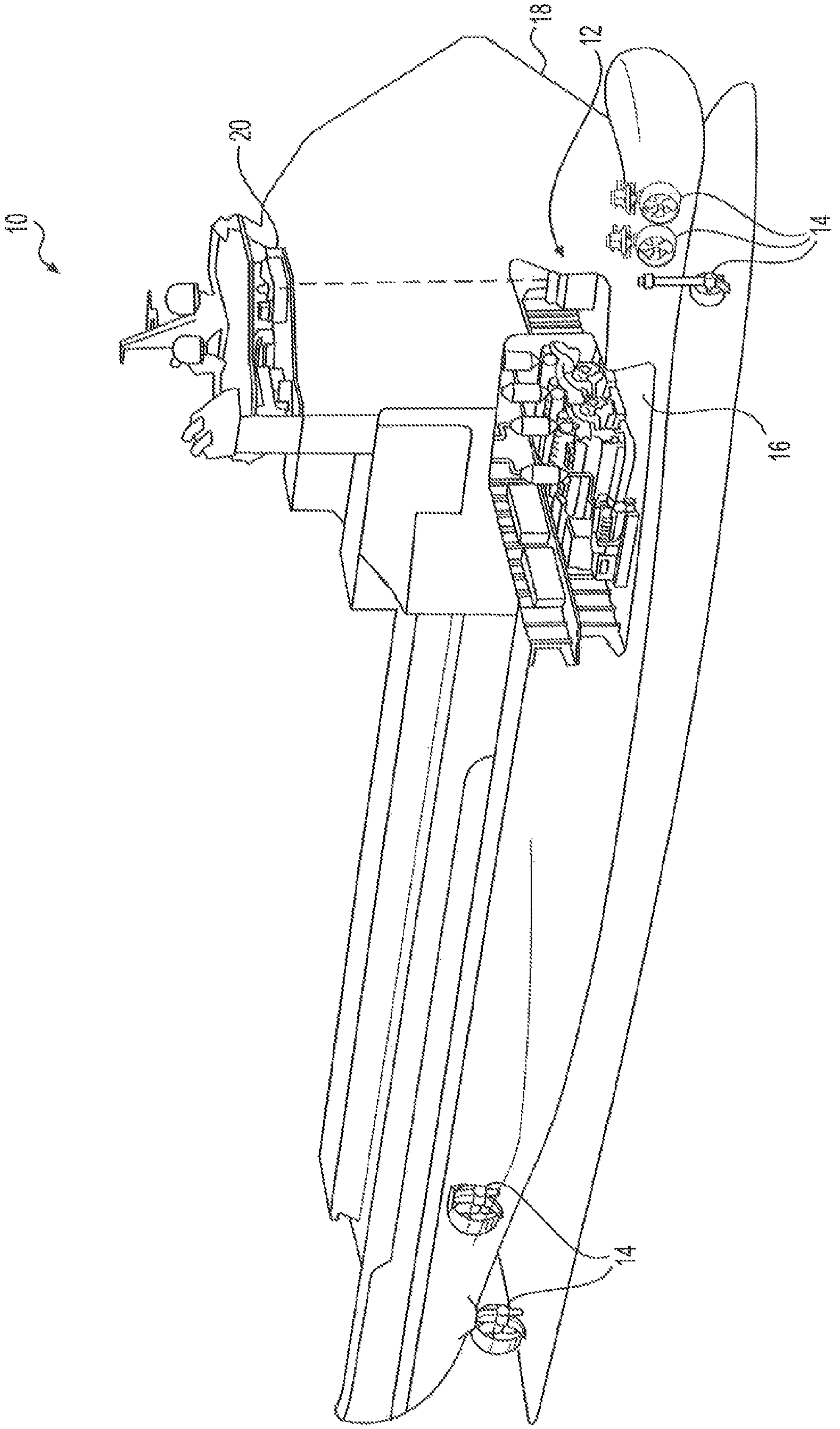
FIG. 1 is an isometric illustration of an exemplary disclosed machine.

FIG. 1 illustrates a marine vessel ("vessel") 10 having a power system 12 configured to supply power to one or more consumers or loads 14. The power system 12 may be anchored to a platform 16 within a hull 18 of vessel 10, and at least partially controlled from a bridge 20 (or another location onboard and/or offboard the vessel 10). The loads 14 may include any device(s) that consume mechanical and/or electrical power, including, but not limited to, motors that drive propellers of the vessel 10, electric lights, HVAC systems, water pumps, and other auxiliary loads that are normally found on a conventional marine or petroleum drilling vessel.

Figure 2:
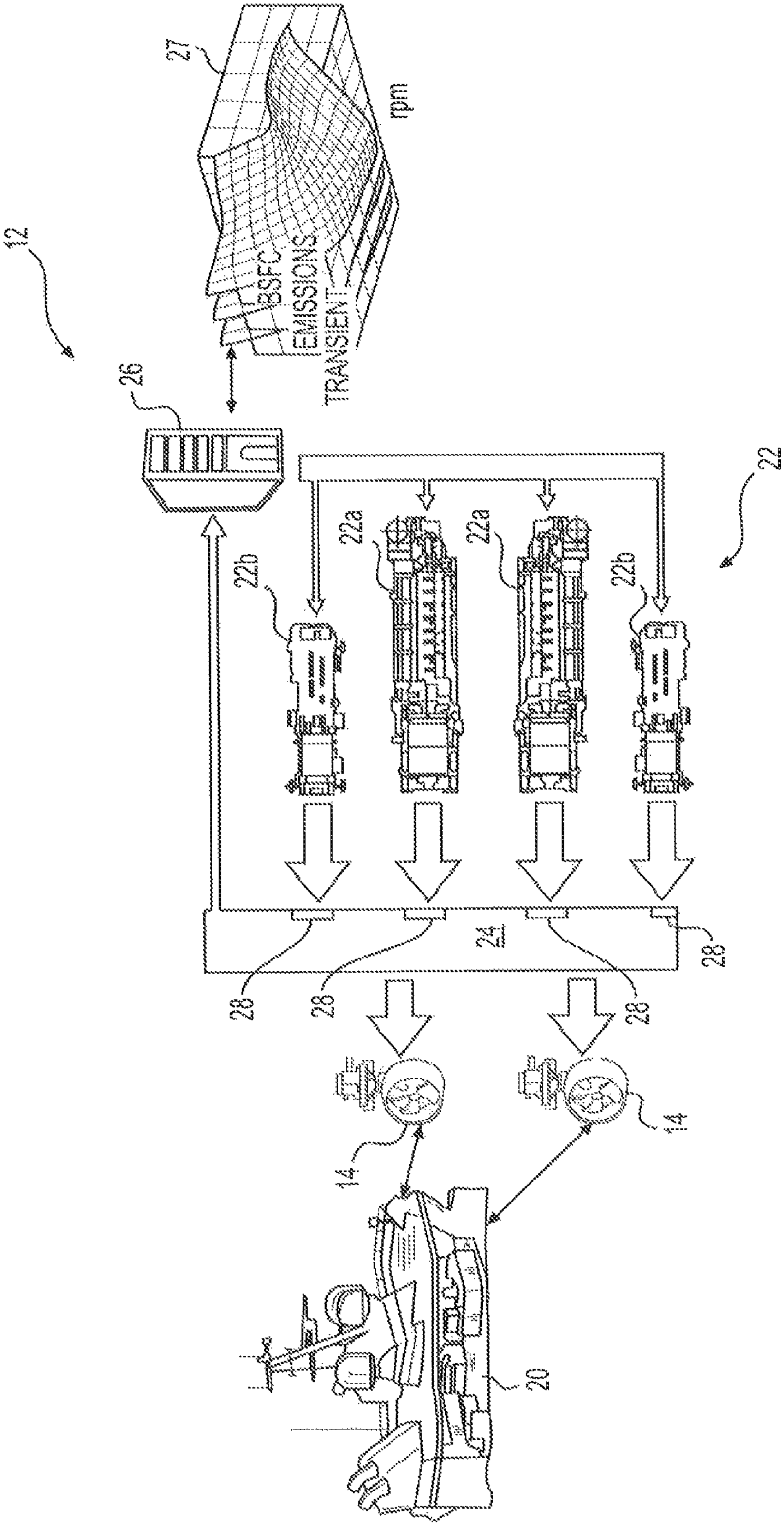
FIG. 2 is an diagrammatic illustration of an exemplary disclosed power system that may be used in conjunction with the machine of FIG. 1.

FIG. 2 illustrates an exemplary embodiment of the power system 12. As can be seen in FIG. 2, the power system 12 may include, among other things, a plurality of power sources 22, a load manager 24, and a power system controller ("controller") 26. The power sources 22 may create mechanical and/or electrical power outputs. The load manager 24 may determine a demand for power from the power sources 22 based on input received from the bridge 20 and/or on actual outputs (e.g., a performance) of the loads 14. The controller 26 may selectively adjust operation of the power sources 22 in unique ways to meet the demand from the load manager 24.

The power sources 22 may embody any number and type of combustion engines, some or all of which that are connected to corresponding generators to form generator sets. The mechanical outputs of the combustion engines may be routed directly to the loads 14 (e.g., mechanically routed to the propellers) and/or indirectly by way of the generators (e.g., electrically routed to motors of the propellers and to the other auxiliary loads). In the disclosed embodiment, the power system 12 includes four different power sources 22 arranged into two different pairs of substantially identical generator sets. These pairs include two larger medium-speed generator sets 22*a* and two smaller high-speed generator sets 22*b*. The larger medium-speed generator sets 22*a* may be capable of greater power output at higher fuel efficiency (i.e., lower fuel consumption) and/or lower emissions. The smaller high-speed generator sets 22*b*, however, may be capable of faster transient response and high-efficiency low-load operation. By including a mix of different types and/or sizes of generator sets, benefits associated with the different sets may be realized. It is contemplated, however, that a particular vessel 10 could include all identical generator sets, all different generator sets, or any other configuration of generator sets, as desired. It is also contemplated that power sources other than engines and generators may be used to power the vessel 10, for example batteries, fuel cells, or other power storage devices.

The load manager 24 may be configured to compare an actual output of the power system 12 to a desired output (e.g., to a desired travel speed, to a desired propeller speed, to a desired vessel location, etc.), and to responsively create a power demand based on the difference. In the disclosed embodiment, the load manager 24 includes one or more generator controllers that are configured to compare an actual bus voltage to a desired voltage and to responsively generate commands for a change in electrical power supply based on the difference. In the example of FIG. 2, the propellers of the vessel 10 are electrically powered from a common bus and directly controlled via the bridge 20. In this example, the captain of the vessel 10 (or another operator) may move a throttle lever (not shown) to command the vessel 10 (and/or a particular propeller) to move at a particular desired speed. As signals from the bridge 20 cause the propellers to turn on, turn faster, slow down, or turn off, the motors associated with the propellers may consume more or less electricity from the common power bus. This change in power consumption may cause a corresponding voltage fluctuation in the bus, and the load manager 24 may monitor the voltage fluctuation and responsively generate the demand for more or less electrical power to be supplied by the power sources 22 to the bus.

In another example, the load manager 24 may be a stand-alone component and configured to compare an actual vessel or propeller speed to a desired speed and to responsively generate a demand for a change in power (mechanical and/or electrical) based on the difference. In yet another example, the load manager 24 may compare an actual vessel position and/or orientation to a desired position or orientation, and responsively generate a demand for a change in power based on the difference. Other comparisons may also be instituted by the load manager 24, and the load manager 24 may take any conventional configuration known in the art for creating the power demand. Signals generated by the load manager 24 indicative of the power demand may be directed to the controller 26 for further processing.

The controller 26 may include commonly known components that cooperate to apportion the power demand from the load manager 24 among the different power sources 22. The controller 26 may include, among other things, a single or multiple microprocessors, digital signal processors (DSPs), etc. that include means for controlling an operation of the power system 12. Numerous commercially available microprocessors can be configured to perform the functions of the controller 26. It should be appreciated that the controller 26 could readily embody a microprocessor separate from that controlling other vessel- or engine-related functions, or that the controller 26 could be integral with a vessel microprocessor and be capable of controlling numerous functions and modes of operation. As a separate microprocessor, the controller 26 may communicate with the general vessel microprocessor(s) and/or engine controllers via datalinks or other methods. Various other known circuits may be associated with the controller 26, including power supply circuitry, signal-conditioning circuitry, actuator driver circuitry (i.e., circuitry powering solenoids, motors, or piezo actuators), and communication circuitry.

The controller 26 may apportion a given power demand from the load manager 24 equally or unequally between the different power sources 22 based on any number of different performance goals. For example, the controller 26 may apportion the power demand a first way when the performance goal is to reduce fuel consumption (Brake Specific Fuel Consumption—BSFC), a second way when the performance goal is to provide high-transient response, a third way when the performance goal is to produce low-emissions, and a fourth way when the performance goal is to reduce wear of the power sources 22. For instance, for a given power demand from the load manager 24, the controller 26 may command the larger medium-speed generator sets 22*a* to satisfy more of the demand when the performance goal is low-fuel consumption and/or low-emissions. But for the same demand, the controller 26 may command the smaller high-speed generator sets 22*b* to satisfy more of the demand when the performance goal is associated with transient response or wear.

In the exemplary embodiment, the performance goals may be automatically defined based on a current operational mode of the vessel 10. Specifically, the current operational mode of the vessel 10 (e.g., a Dynamic Positioning mode—DP mode, a Transit mode, or a Pulling mode) may correspond with a predefined set of one or more particular performance goals. For example, during the DP mode of operation, when the vessel 10 is away from port and its stationary position is being automatically maintained by selective operation of the propellers, the set of predefined performance goals may include low-fuel consumption, then high-transient response, then low-emissions. However, during the Transit mode of operation, when the vessel 10 is moving at slow speed under regulated conditions within a port setting, the predefined set of performance goals may include low-emissions, then low-fuel consumption, then high-transient response. And during the Pulling mode of operation, when the vessel 10 is away from port and actively traveling toward a destination, the predefined set of performance goals may include high-transient response, then low-fuel consumption, then low-emission. It should be noted that other modes of operation may be possible, and that the performance goals may be arranged into other predefined sets corresponding to any of the modes, as desired.

The controller 26 may apportion the power demand from the load manager 24 based on different control maps 27 associated with each power source 22. Specifically, the controller 26 may retrieve from each power source 22 (e.g., from a control unit associated with each engine and/or with each generator) at least one map 27 associated with each performance goal. For example, the controller 26 may retrieve a fuel consumption map 27, an emissions map 27, a transient response map 27, a wear map 27, and/or any other map 27 known in the art. These maps 27 may normally be used by the different power source controllers to regulate fueling (e.g., start of injection timing, injection duration, injection pressure, injection amount, end of injection timing, number of injection pulses, etc.) of the different engines and/or field spacing of the different generators at a given engine speed. The controller 26, however, may utilize these maps 27 to determine a combined performance of all power sources 22 at different possible apportionment configurations and to then select a particular configuration that achieves the predefined set of goals corresponding to the current mode of operation. It is contemplated that the maps 27 may be different for each power source 22 and/or for each different type of power source 22, as needed.

For example, when the current mode of operation is associated with a low-fuel consumption goal, the controller 26 may retrieve a fuel consumption map 27 from the engine controller of each power source 22. The controller 26 may then compare different apportionments of the power demand from the load manager 24 with the fuel consumption map 27 to determine the particular configuration of apportionments that provides the overall lowest fuel consumption possible from all of the different power sources 22. In some embodiments, this may result in an equal apportionment of the power demand between the power sources 22. In most instances, however, the apportionment may be unequal. In fact, in some instances, one or more of the power sources 22 may be operated to satisfy a majority of the power demand and one or more others of the other power sources 22 may supply little of the demand or even be turned off.

When multiple performance goals are included within a predefined set of goals, the controller 26 may retrieve multiple performance maps 27 from the engine controllers. The controller 26 may then reference the different maps 27 with weightings based on a priority of the goals within the set. In some embodiments, the controller 26 may overlap the maps 27 or otherwise create collective 3-D maps 27 (see FIG. 2) that relate parameters associated with the different performance goals. The controller 26 may then reference the priority weightings with the collective maps 27 to determine the apportionments that satisfy the power demand in a manner based on the priority of the goals. For example, the controller 26 may use the priority weightings as scale factors when apportioning the power demand. It may be possible that, when multiple goals are included within a particular predefined set, the outcome of the first performance goal may not be the best possible outcome, as the outcome of the second and third performance goals may have some effect on the outcome of the first performance goal.

In some applications, it may be possible over time for performance of a particular power source 22 to drift away from the control maps 27 stored within the corresponding engine controllers. For example, it may be possible for an older engine to have decreased performance due to wear, or for system inputs (e.g., fuel quality, wind current, ocean current, ambient air temperature, etc.) to deviate from assumed or expected values. In these situations, the controller 26 may be capable of modifying the existing control maps 27 based on monitored engine performance. Specifically, the controller 26 may be capable of monitoring, processing, and recording engine performance for future use in power demand apportioning.

The controller 26 may rely on different sensors 28 when monitoring engine performance and/or modifying the existing control maps 27. These sensors 28 may include, for example, one or more fuel flow meters associated with each engine, speed sensors, torque sensors, emission sensors (e.g., NOx sensors), temperature sensors, pressure sensors, voltage sensors, current sensors, fuel level sensors, DEF (diesel exhaust fluid) level sensors, DEF flow meters, and other performance sensors. The controller 26 may also be capable of computing different aspects of engine and/or generator performance based on measured parameters. For example, the controller 26 may be capable of computing engine torque, emissions, and/or wear based on measured rpm, fuel flow rates, temperatures, and/or pressures. The controller 26 may then update and/or create the required control maps 27 based directly on the measured parameters and/or based on the calculated parameters. It is contemplated that, in some circumstances, the controller 26 may only determine performance drift away from the control maps 27 based on the measured/calculated parameters, and then allow the captain of the vessel 10 to selectively implement or ignore accommodations for the drift, as desired.

In some applications, the controller 26 may also selectively apportion the power demand between the different power sources 22 based on a desired power reserve. Specifically, the captain of the vessel 10 may desire a particular amount of power be left in reserve from particular power sources 22, and this power reserve may limit the way in which the controller 26 can apportion the power demand.

Figure 3:
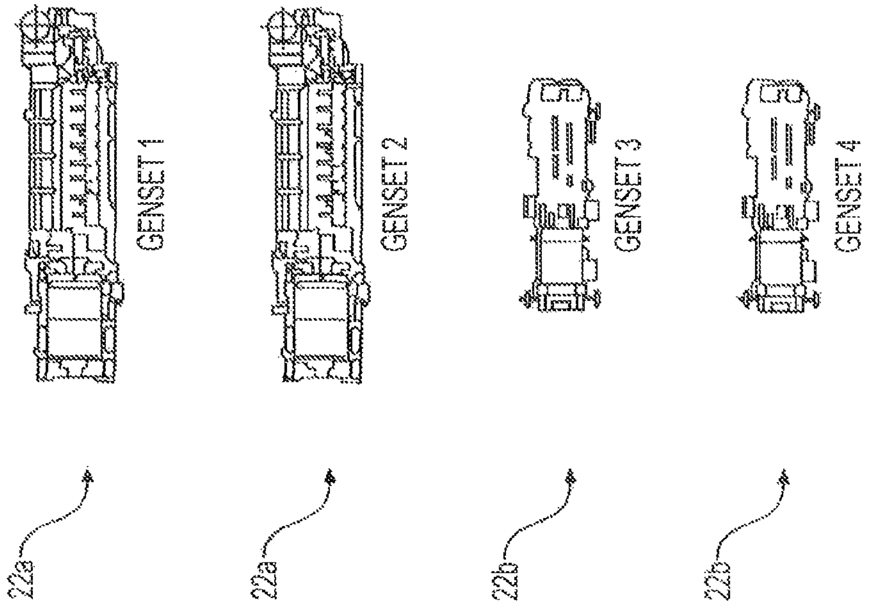
FIG. 3 is a control table associated with operation of the power system of FIG. 2.
Figure 4:
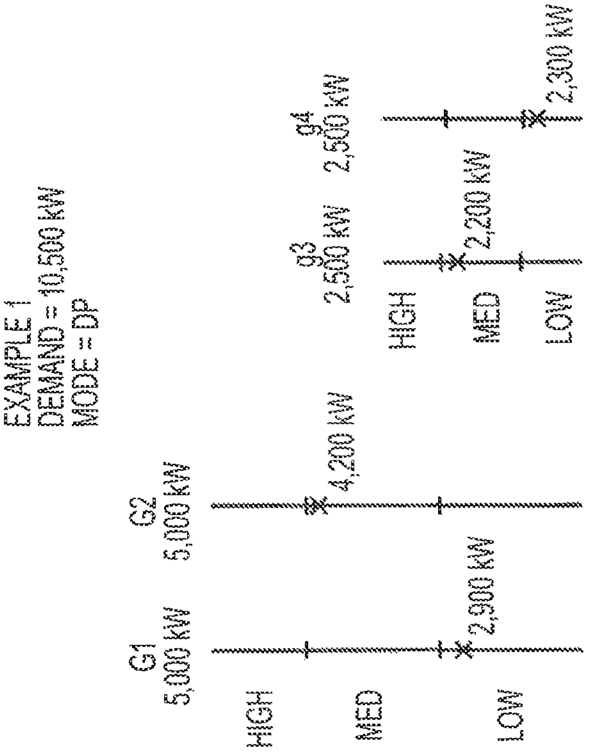
FIGS. 4-7 are control charts depicting exemplary operations of the power system of FIG. 2.
Figure 5:
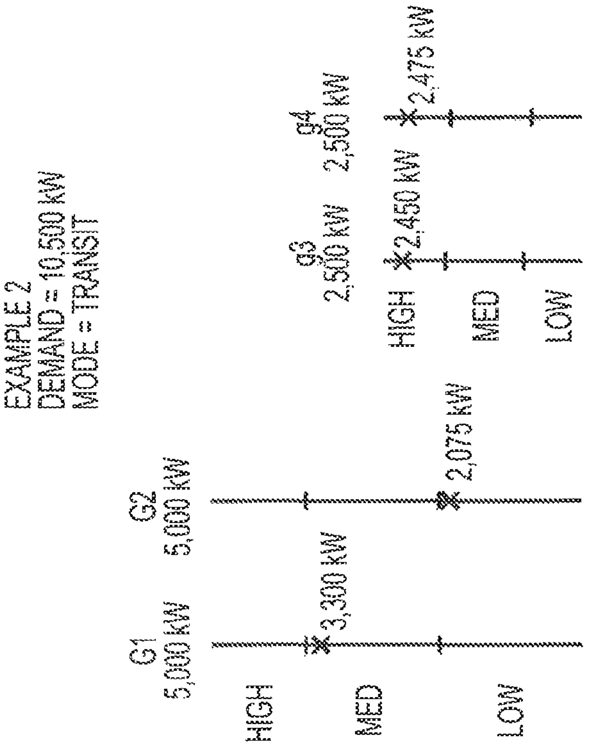
Figure 6:
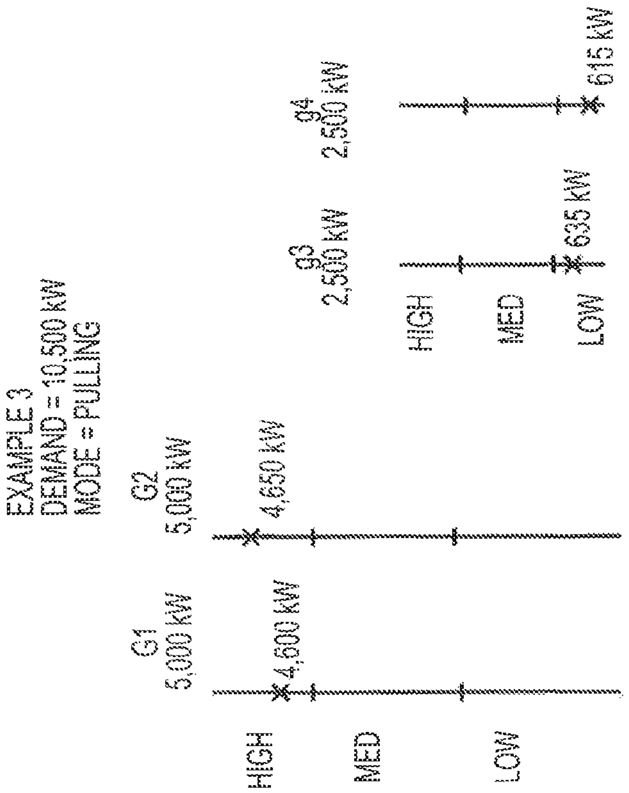

FIG. 3 illustrates an exemplary way to apportion a given power demand between various power sources 22 based directly on the current mode of operation, such that the corresponding performance goals are satisfied. Specifically, the operational range of each power source 22 may be divided into multiple power zones (e.g., a high zone, a medium zone, and a low zone). It should be noted that the operational range of each power source 22 may be divided into any number of zones, and that the number of zones for a particular power source 22 may be the same as or different than the number of zones for another power source 22.

Depending on the current operational mode of vessel 10, each individual power source 22 may be commanded to operate within a particular one of its zones. In FIG. 3, the two larger medium-speed generator sets **22*a* are identified as Genset 1 and Genset 2, while the two smaller high-speed generator sets 22*b* are identified as genset 3 and genset 4**.

During the DP mode of operation, Genset 1 may be caused to operate within its high-power zone; Genset 2 may be caused to operate within its medium-power zone; genset 3 may be caused to operate within its medium-power zone; and genset 4 may be caused to operate within its low-power zone. During the Transit mode of operation, Genset 1 may be caused to operate within its medium-power zone; Genset 2 may be caused to operate within its low-power zone; genset 3 may be caused to operate within its high-power zone; and genset 4 may be caused to operate within its high-power zone. During the Pulling mode of operation, Genset 1 may be caused to operate within its high-power zone; Genset 2 may be caused to operate within its high-power zone; genset 3 may be caused to operate within its low-power zone; and genset 4 may be caused to operate within its low-power zone. By operating within these assigned zones, the set of performance goals associated with the current mode of operation may be achieved to a higher degree.

As shown in FIGS. 4-7, each power zone of each power source 22 may be established by an upper limit and a lower limit, which are both generally centered about a desired operating point that most effectively achieves the associated performance goals. That is, when all of the power sources 22 are operating at their individual desired operating points, the performance goals associated with the current mode of operation may be achieved. And as a particular power source 22 deviates from its desired operating point, the performance of the vessel 10, as a whole, may also deviate from the goals. As long as operation of each power source 22 remains within its assigned power zone, the goals may be approached with a high degree of certainty.

Although operation of the power sources 22 may target specific power zones in order to best achieve a single performance goal or a combination of goals, it should be noted that each power source 22 may still be allowed to deviate from its assigned power zone, as necessary, in order to satisfy a changing load demand. For example, after assignment to operate within a particular power zone, as the load demand increases or decreases, each power source 22 may likewise increase or decrease its output to continue to satisfy the changing load demand. In some instances, this may cause the performance of a particular one or more of the power sources 22 to deviate from its assigned power zone normally associated with the current mode of operation.

As the performance of a particular power source 22 reaches a boundary of its assigned power zone (e.g., reaches the upper or lower limit of the power zone), a new power zone of operation may be assigned to that particular power source 22. The new power zone may be generally centered about a point that optimizes the associated goals at the new power level. When a particular power source 22 is assigned a new power zone after its power output crosses the boundary of the previous power zone, the current operating levels of the remaining power sources 22 may be adjusted. For example, if Genset 1 were to cross an upper limit of its originally assigned power zone and move its power production to the center of a new power zone, Genset 1 would start carrying a greater percentage of the overall load demand. As a result, each of the remaining power sources 22 would be required to produce a lower percentage of the overall load demand and actually shift to a lower power output position within their assigned power zones. During gradual load demand changes and step changes of lower magnitude, only one power source 22 may transition between power zones at a time. However, during large step changes in the load demand, multiple power sources 22 may transition between power zones simultaneously.

In one embodiment, the power zone sizes of identical power sources 22 may be different in order to improve stability of the power system 12. Specifically, if the power zones were sized the same, as load demand increased or decreased within a single mode of operation, a point would eventually be reached at which all of the identical power sources 22 would be caused to simultaneously transition to a new power zone. This could cause noticeable shifts in power production that may result in system instability. Accordingly, while the power zones of identical power sources 22 may still be centered about the same general point within their ranges of operation that corresponds with optimization of a particular goal, the boundaries of the different power zones may vary in distance away from the center point for different power sources 22. For example, the medium-power zone of one power source 22 may have a smaller range than the medium-power zone of another identical power source 22, such that relatively small changes in the power demand would cause only one of the identical power sources 22 to transition between power zones at a time with less dithering between power zones.

The sizes and/or number of power zones designated for each power source 22 may be based, at least in part, on a number and capacity of the power sources 22 included within the power system 12. In general, the sizes and number of power zones may be selected to provide a greatest amount of stability, while also providing a desired responsiveness. As the number of power sources 22 increases, the number of power zones for each power source 22 may also increase and a range of each power zone may decrease. Likewise, for power sources 22 having a greater capacity, the size of each power zone may generally be larger, while the power sources 22 that are more responsive may have smaller power zones. This may help to ensure that a limited number of the power sources 22 may transition at a time.

Four different operational examples of power system 12 are provided in FIGS. 4-7. FIGS. 4-7 will be discussed in more detail in the following section to further illustrate the disclosed concepts.

Figure 8:
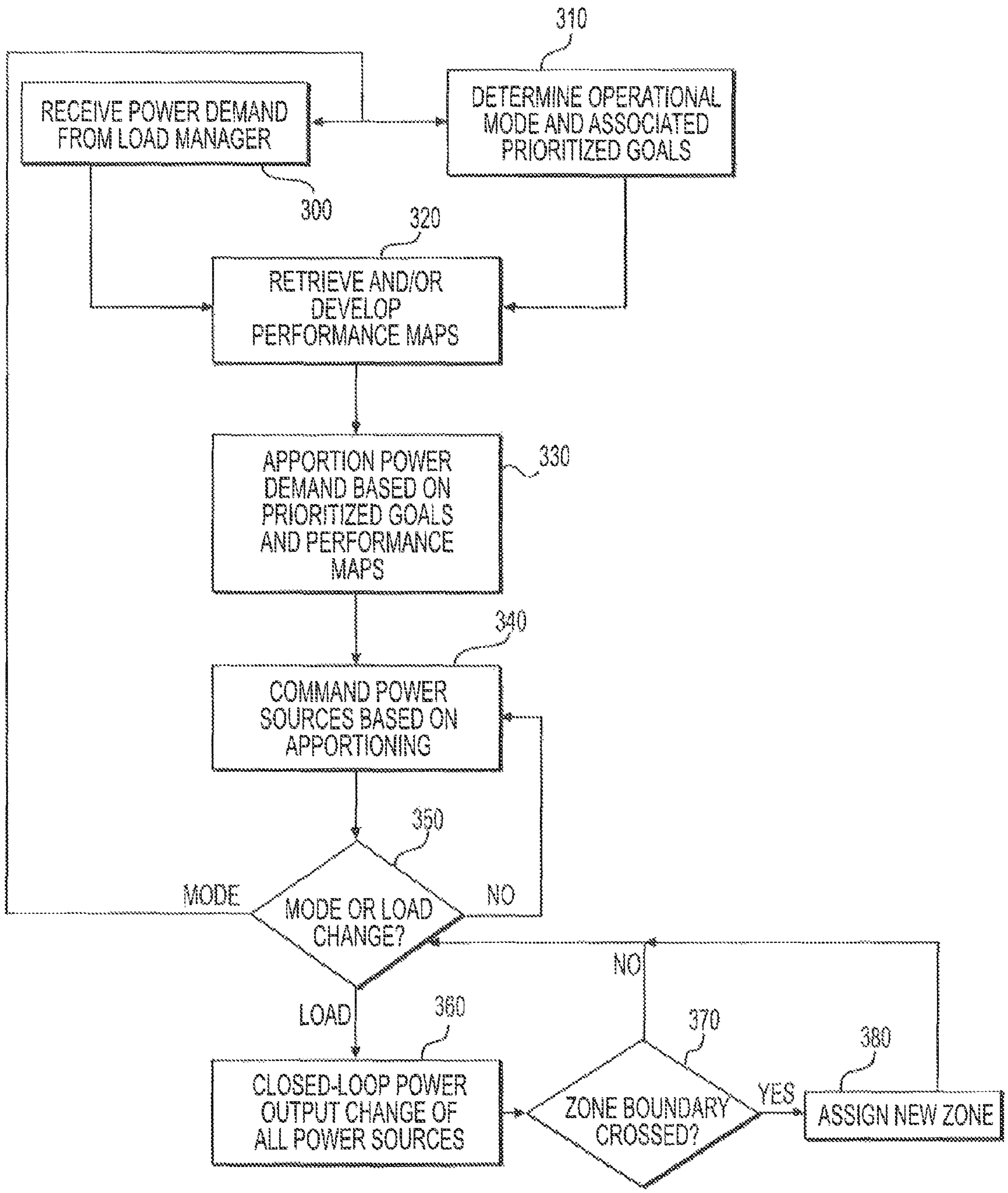
FIG. 8 is a flowchart depicting an exemplary disclosed method of operating the power system of FIG. 2.

FIG. 8 is a flow chart depicting an exemplary method of operating the power system 12. FIG. 8 will also be discussed in the following section to further illustrate the disclosed system and its operation.

INDUSTRIAL APPLICABILITY

The disclosed power system may be applicable to any mobile machine having multiple power sources. However, the disclosed power system may be primarily applicable to a marine and/or petroleum drilling vessel application, where the power sources cooperate to propel the vessel and to power auxiliary loads under varying conditions. The disclosed power system may allow for enhanced performance through optimization of select goals in a priority that is automatically selected based on a current operation of the vessel. Operation of power system 12 will now be described in detail.

As shown in FIG. 8, operation of the power system 12 may begin with the controller 26 receiving a power demand from the load manager 24 (Step 300). The power demand may be based on, for example, a voltage level detected on a common bus directing power from the power sources 22 to one or more loads 14 (e.g., to propellers and an HVAC system) of the vessel 10. In response to the voltage level, the load manager 24 may call for a corresponding power output by the power sources 22. In the disclosed example, the power system 12 may be capable of outputting about 15,000 kW with four power sources 22 (i.e., with the two larger medium-speed generator sets 22*a* at 5,000 kW each, and the two smaller high-speed generator sets 22*b* at 2,500 kW each).

At about the same time, the controller 26 may determine a current operational mode of the vessel 10 and a corresponding list of prioritized performance goals (Step 310). The current operational mode may be manually input by the captain of the vessel 10 and/or automatically determined by the controller 26 based on any number of different parameters (e.g., based on current location, current speed, current maneuvering, etc.). In the disclosed example, the current operational mode may be one of the DP mode, the Transit mode, and the Pulling mode. The corresponding list of prioritized goals may be automatically linked to the current operational mode of the vessel 10. In some embodiments, the list of prioritized goals corresponding to each mode of operation may be manually changed or selectively overridden, if desired.

After receiving the power demand from the load manager 24 and after determining the current operational mode and the corresponding prioritized list of goals, the controller 26 may obtain (i.e., retrieve and/or develop) the associated performance maps 27 (Step 320). As discussed above, the controller 26 may retrieve the same performance maps 27 from the controllers (i.e., from the engine and/or generator controllers) of power sources 22 that are normally used to regulate operation (e.g., fueling, boost, etc.) of the associated engines and/or generators. These maps 27 may include fuel consumption maps, emissions maps, transient response maps, wear maps, and any other maps known in the art. And when these maps 27 are no longer accurate, the controller 26 may develop and update the maps 27 based on monitored performance.

The controller 26 may then apportion the power demand received from the load manager 24 among the power sources 22 based on the retrieved maps 27 and in a way that best achieves the prioritized goals (Step 330). For example, if the current operational mode is the DP mode, the controller 26 may determine that the list of prioritized goals should be high-transient response, then low-fuel consumption, then low-emission. And for this prioritization, the controller 26 may apportion the power demand among the different power sources 22 using the predefined power zones shown in FIG. 4. Specifically, for a power demand of about 10,500 kW, the controller 26 may call for Genset 1 to operate in its low-power zone and produce about 2,900 kW; for Genset 2 to operate in its medium-power zone and to produce about 4,200 kW; for genset 3 to operate in its medium-power zone and produce about 2,200 kW; and for genset 4 to operate in its low-power zone and produce about 1,300 kW. Together, all the power sources 22 may satisfy the demand of 10, 500 kW, with about 4,500 kW left in reserve.

If the current operational mode is instead the Transit mode (shown in FIG. 5), the controller 26 may determine that the list of prioritized goals should instead be low-emission, then low-fuel consumption, then high-transient response. And for this prioritization, the controller 26 may alternatively apportion the power demand among the different power sources 22 using the predefined power zones shown in FIG. 5. Specifically, the controller 26 may call for Genset 1 to operate in its high-power zone and produce about 3,300 kW; for Genset 2 to operate in its low-power zone and to produce about 2,075 kW; for genset 3 to operate in its high-power zone and produce about 2,450 kW, and for genset 4 to operate in its high-power zone and produce about 2,475 kW. Together, all the power sources 22 may satisfy the demand of 10, 500 kW, with about 4,500 kW left in reserve When the current operational mode is the Pulling mode, the controller 26 may determine that the list of prioritized goals should be low-fuel consumption, then high-transient response, then low-emissions. And for this prioritization and based on the same power demand of 10,500 kW, the controller 26 may apportion the power demand using the predefined power zones shown in FIG. 6. Specifically, the controller 26 may call for Genset 1 to operate in its high-power zone and produce about 4,600 kW; for Genset 2 to operate in its high-power zone and to produce about 4,650 kW; for genset 3 to operate in its low-power zone and produce about 635 kW; and for genset 4 to operate in its low-power zone and produce about 625 kW. Together, all the power sources 22 may satisfy the demand of 10, 500 kW, with about 4,500 kW left in reserve.

After determining the appropriate apportionment of the power demand among the available power sources 22 using the predefined power zones, the controller 26 may then command corresponding operation of the power sources 22 (Step 340). In some instances, the apportionment determined by the controller 26 may be displayed within the bridge 20. By displaying the apportionment configuration within the bridge 20, the captain may have the opportunity to adjust and/or override the configuration, if desired.

After causing the power sources 22 to operate within particular power zones and thereby satisfy the given load demand, it may be possible for the load demand and/or mode of operation to change. Accordingly, the controller 26 may be configured to constantly monitor the load demand and mode of operation, and to respond to any changes (Step 350). As long as the mode and the load demand remain about the same, control may cycle from step 350 back to step 340. When the mode of operation changes, control may instead cycle from step 350 simultaneously back to steps 300 and 310.

However, when the load demand changes while operation of vessel 10 remains in the same mode of operation, the controller 26 may be configured to change the output of all the power sources 22 in closed-loop manner based on the changing load demand (Step 360). For example, the load demand may increase from 10,500 kW to 13,500 kW while the vessel 10 remains in the pulling mode (See FIGS. 6 and 7 together). As long as the vessel 10 continues to operate within the same mode, the controller 26 may not automatically re-assign zones to all the power sources 22 each time the load demand changes. Instead, each power source 22 may be independently controlled to adjust its own power output within its assigned power zone to thereby accommodate the change in load demand. As exhibited in the load demand increase between FIGS. 6 and 7, each power source 22 may be caused to increase its power output. The increase may be the same for all the power sources 22 or different, and based on the size, type, and/or capacity of each power source 22.

Figure 7:
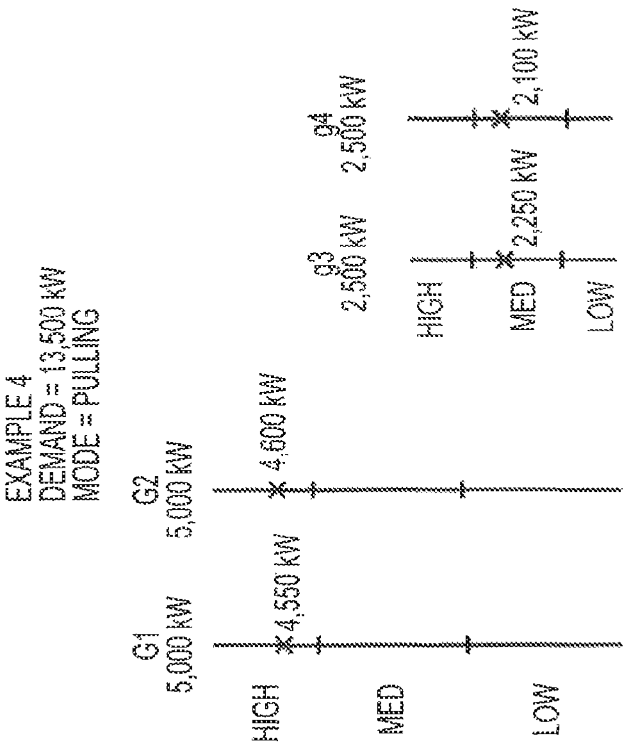

As the power output of individual power sources 22 changes (e.g., increases) to accommodate the changing (e.g., increasing) load demand, a point may eventually be reached at which a particular power zone boundary (e.g., the upper limit) is crossed. The controller 26 may continuously compare the current power output to the boundaries of the assigned power zone (Step 370) and, when a boundary is crossed, the controller 26 may assign a new power zone to that particular power source 22 (Step 380). For example, as shown in FIG. 7, when the load demand increases from 10,500 kW to 13,500 kW during the pulling mode of operation, gensets 3 and 4 may increase their outputs past the upper limits of their low-power zones. In response to this boundary crossing, the controller 26 may reassign gensets 3 and 4 to operate in their medium-power zones and produce about 2,250 kW and 2,200 kW, respectively. At this same time, the power output of Gensets 1 and 2 remains within their high-power zones, but decreases to 4,550 kW and 4,600 kW, respectively. While the overall demand and power output of power system 12 both increase, the individual contributions of Gensets 1 and 2 actually decrease slightly due to the upward zone transitions of gensets 3 and 4. That is, gensets 3 and 4 are shown as providing a greater percentage of the load demand in the example of FIG. 7, allowing for an output reduction of Gensets 1 and 2 within their assigned power zones. While the apportiomnent shown in FIG. 7 might not be as ideal (e.g., as efficient, responsive, or low-emission) as the apportionment shown in FIG. 6 if the load demand where to remain constant, the apportionment of FIG. 7 may be the most ideal for the increased load demand and the current mode of operation. Control may cycle from step 380 back to step 350. As long as a power zone boundary is not crossed, control may cycle from step 370 to step 350 (i.e., controller 26 may not assign a new power zone).

Many advantages may be associated with the power system 12. For example, because the controller 26 may retrieve the performance maps 27 directly from the power sources 22, it may be likely that the maps 27 are maintained and contain all of the information necessary to properly operate the power sources 22. In other words, the power source 22 may not be required to operate on only publically available information. Further, the power system 22 may allow for multiple performance goals to be simultaneously improved upon in different ways depending on a priority of the goals. For these reasons, the power system 22 may have enhanced applicability to many different situations.

In addition, the power system 12 may operate under stable conditions. Specifically, because each power source 22 may be assigned to operate within a particular power zone associated with the selected performance goals, as opposed to operating at a single optimized point, small changes in the load demand may not require completely new apportionment of the load demand. Each time the load demand is re-apportioned, a time delay may be introduced into the system and, accordingly, by avoiding unnecessary re-apportioning, fewer time delays may be experienced. In addition, individual power sources 22 may not be constantly shifting between new set points, due to their freedom to move within an allowed power zone. Further, because the power sources 22 may be set up to transition between power zones one-at-a-time (under relatively small load demand changes), the transitions may be smooth and seamless. Finally, because each power source 22 may be free to operate within its entire performance range, greater flexibility over control of the power system 12 may be obtained.

It will be apparent to those skilled in the art that various modifications and variations can be made to the disclosed power system. Other embodiments will be apparent to those skilled in the art from consideration of the specification and practice of the disclosed power system. It is intended that the specification and examples be considered as exemplary only, with a true scope being indicated by the following claims and their equivalents.

What is claimed is:

1. A power system, comprising:

a plurality of power sources each having an operating range divided into a plurality of power zones, wherein each of the power sources comprises at least one of an engine and a generator mounted on a vessel;

at least one power consumer driven by the plurality of power sources, wherein each of the at least one power consumer comprises a device on the vessel that consumes power produced by the power sources;

a load manager associated with the at least one power consumer and configured to create a load demand for the plurality of power sources; and a controller in communication with the load manager and the plurality of power sources, the controller being configured to:

determine a current operational mode of the power system;

retrieve at least one performance map from a power source control unit of each of the plurality of power sources, wherein the at least one performance map is selected from one or more of a fuel consumption map, an emission map, a transient response map, and a wear map; and selectively cause the plurality of power sources to each operate within a particular power zone associated with selected performance goals for the power system, and the particular power zone being one of the plurality of power zones included in the operating range of the power source, and wherein selectively causing the power source to operate within the particular power zone is based on the current operational mode, the at least one performance map for the power source, and the load demand.

2. The power system of claim 1, wherein:

the controller is configured to determine the current operational mode as one of a plurality of predefined operational modes; and the controller is further configured to link a different set of performance goals to each of the plurality of predefined operational modes.

3. The power system of claim 2, wherein causing the plurality of power sources to operate in particular zones of the plurality of power zones results in achieving of the different set of performance goals associated with the current operational mode.

4. The power system of claim 3, wherein the controller is further configured to: determine a change in the current operational mode of the power system; and selectively cause the plurality of power sources to operate in different zones of the plurality of power zones based on the change in the current operational mode.

5. The power system of claim 4, wherein the controller is further configured to: determine a change in the load demand; and selectively cause the plurality of power sources to continue to operate in the particular zones of the plurality of power zones based on the change in the load demand as long as the current operational mode remains unchanged and the change in the load demand can be accommodated.

6. The power system of claim 5, wherein the controller is further configured to selectively increase a power output of the plurality of power sources in a closed-loop manner based on the change in load demand.

7. The power system of claim 6, wherein the controller is further configured to: determine when the power output of at least one of the plurality of power sources reaches a boundary of an associated zone of the plurality of power zones; and responsively cause the at least one of the plurality of power sources to transition operation into a new zone of the plurality of power zones.

8. The power system of claim 7, wherein the controller is configured to responsively cause only one of the plurality of power sources to transition operation between zones of the plurality of power zones at a time.

9. The power system of claim 2, wherein the performance goals are associated with transient response, fuel consumption, emissions, and engine wear.

10. The power system of claim 1, wherein:
the plurality of power sources includes a plurality of generator sets; and
the plurality of generator sets includes generator sets having different output capabilities.

11. The power system of claim 10, wherein at least one of the plurality of generator sets is caused to operate in a power zone different from power zones operated in by others of the plurality of generator sets.

12. The power system of claim 11, wherein the at least one power consumer includes at least one of a propeller of a marine vessel and auxiliary loads of the marine vessel.

13. The power system of claim 1, wherein the current operational mode is one of a dynamic positioning mode, a pulling mode, and a transit mode.

14. The power system of claim 1, wherein the controller is configured to apportion the load demand unequally between the plurality of power sources by causing the plurality of power sources to operate in particular zones of the plurality of power zones.

15. A power system, comprising:
a plurality of generator sets of different capacities and each having an operating range divided into a plurality of power zones, wherein each of the generator sets is mounted on a vessel;
at least one power consumer driven by the plurality of generator sets, wherein each of the at least one power consumer comprises a device on the vessel that consumes power produced by the generator sets;
a load manager associated with the at least one power consumer and configured to create a load demand for the plurality of generator sets; and
a controller in communication with the load manager and the plurality of generator sets, the controller being configured to:
retrieve at least one performance map from a power source control unit of each of the plurality of generator sets, wherein the at least one performance map is selected from one or more of a fuel consumption map, an emission map, a transient response map, and a wear map;
determine a current operational mode of the power system as one of a dynamic positioning mode, a transit mode, and a pulling mode;
link a set of performance goals associated with fuel consumption, emissions, transient response, and engine wear to the current operational mode;
selectively cause the plurality of generator sets to each operate within a particular power zone associated with selected performance goals for the power system, and the particular power zone being one of the plurality of power zones included in the operating range of the generator set, and wherein selectively causing the generator set to operate within the particular power zone is based on the current operational mode, the set of performance goals, and the load demand;
determine a change in the load demand;
selectively increase a power output of the plurality of generator sets in closed-loop manner based on the change in load demand;
determine when the power output of at least one of the plurality of generator sets reaches a boundary of an associated zone of the plurality of power zones; and
responsively cause the at least one of the plurality of generator sets to transition operation into a new zone of the plurality of power zones.

16. A method of controlling a power system, comprising:
creating, using a load manager, a demand for power to be directed from a plurality of power sources to at least one power consumer, wherein each of the power sources comprises at least one of an engine and a generator mounted on a vessel, and wherein each of the at least one power consumer comprises a device on the vessel that consumes power produced by the power sources;
determining, using a processor of a controller, a current operational mode of the power system;
retrieving, using a processor of the controller, at least one performance map from a power source control unit of each of the plurality of power sources, wherein the at least one performance map is selected from one or more of a fuel consumption map, an emission map, a transient response map, and a wear map; and
selectively causing, using a processor of the controller, each of the plurality of power sources to operate within a particular power zone of a plurality of power zones included in an operating range of the power source, the particular power zone being associated with selected performance goals for the power system, and wherein selectively causing the power source to operate within the particular power zone is based on the current operational mode, the at least one performance map for the power source, and the demand for power.

17. The method of claim 16, wherein:
determining the current operational mode includes determining the current operational mode as one of a plurality of predefined operational modes; and
the method further includes linking a different set of performance goals to each of the plurality of predefined operational modes.

18. The method of claim 17, wherein causing each of the plurality of power sources to operate within a particular power zone of a plurality of power zones included in an operating range of the power source results in achieving of the different set of performance goals associated with the current operational mode.

19. The method of claim 18, further including:
determining a change in the current operational mode of the power system; and
selectively causing the plurality of power sources to operate in different zones of corresponding operating ranges of each power source based on the change in the current operational mode.

20. The method of claim 19, further including:
determining a change in the demand for power;
selectively increasing a power output of the plurality of power sources in closed-loop manner based on the change in the demand for power;
determining when the power output of at least one of the plurality of power sources reaches a boundary of an associated zone within the corresponding operating ranges; and responsively causing the at least one of the plurality of power sources to transition operation into a new zone within the corresponding operating ranges.

* * * * *